United States Patent
Berteloot et al.

(10) Patent No.: US 10,442,933 B2
(45) Date of Patent: Oct. 15, 2019

(54) ANTI-CORROSION PIGMENTS MADE OF ALUMINIUM POLYPHOSPHATE AND RARE EARTH

(71) Applicant: SOCIETE NOUVELLE DES COULEURS ZINCIQUES, Bouchain (FR)

(72) Inventors: Christelle Berteloot, Fenain (FR); Ludovic Mavel, Hordain (FR)

(73) Assignee: SOCIETE NOUVELLE DES COULEURS ZINCIQUES, Bouchain (FR)

(*) Notice: Subject to any disclaimer, the term of this patent is extended or adjusted under 35 U.S.C. 154(b) by 0 days.

(21) Appl. No.: 15/563,931

(22) PCT Filed: Apr. 7, 2016

(86) PCT No.: PCT/EP2016/057583
§ 371 (c)(1),
(2) Date: Oct. 2, 2017

(87) PCT Pub. No.: WO2016/162399
PCT Pub. Date: Oct. 13, 2016

(65) Prior Publication Data
US 2018/0127588 A1    May 10, 2018

(30) Foreign Application Priority Data

Apr. 8, 2015   (FR) ...................... 15 53006

(51) Int. Cl.
| | | |
|---|---|---|
| *C09C 1/40* | (2006.01) | |
| *C09C 1/64* | (2006.01) | |
| *C09D 163/00* | (2006.01) | |
| *C09D 167/00* | (2006.01) | |
| *C08K 3/22* | (2006.01) | |
| *C09B 69/00* | (2006.01) | |
| *C09B 67/08* | (2006.01) | |
| *C09D 5/08* | (2006.01) | |
| *C01B 25/40* | (2006.01) | |
| *C01F 17/00* | (2006.01) | |
| *C09D 175/04* | (2006.01) | |
| *C09D 7/61* | (2018.01) | |

(52) U.S. Cl.
CPC ............ *C09B 69/001* (2013.01); *C01B 25/40* (2013.01); *C01F 17/0043* (2013.01); *C09B 67/0007* (2013.01); *C09C 1/40* (2013.01); *C09C 1/64* (2013.01); *C09D 5/084* (2013.01); *C09D 7/61* (2018.01); *C09D 163/00* (2013.01); *C09D 167/00* (2013.01); *C09D 175/04* (2013.01); *C08K 2003/221* (2013.01)

(58) Field of Classification Search
CPC ..... C09B 69/001; C09B 67/0007; C09D 7/61; C09D 163/00; C09D 167/00; C09D 175/04; C01B 25/40; C01F 17/0043; C09C 1/40; C08K 2003/221
See application file for complete search history.

(56) References Cited

U.S. PATENT DOCUMENTS

| | | | |
|---|---|---|---|
| 9,150,733 B2 * | 10/2015 | Iandoli Espinosa | C09D 4/00 |
| 2008/0000383 A1 * | 1/2008 | Nagai | C09D 5/082 |
| | | | 106/14.44 |
| 2011/0024298 A1 * | 2/2011 | Nishiguchi | C08G 18/643 |
| | | | 205/50 |
| 2011/0081495 A1 * | 4/2011 | Hayashi | C08L 1/04 |
| | | | 427/385.5 |
| 2012/0288700 A1 | 11/2012 | McMullin et al. | |

FOREIGN PATENT DOCUMENTS

| | | | |
|---|---|---|---|
| CN | 104419297 A | 3/2015 | |
| FR | 2 857 672 A1 | 1/2005 | |
| WO | WO 2005/005559 | * 1/2005 | ............ C09D 5/08 |

OTHER PUBLICATIONS

R. Catubig et al., "The use of cerium and praseodymium mercaptoacetate as thiol-containing inhibitors for AA2024-T3," Corrosion Science, vol. 81, Dec. 15, 2013, pp. 45-53, XP028820604.

* cited by examiner

*Primary Examiner* — Pegah Parvini
(74) *Attorney, Agent, or Firm* — Baker & Hostetler LLP

(57) ABSTRACT

An anticorrosive pigment comprising an aluminum polyphosphate comprises at least one cerium-based compound and/or one lanthanum-based compound and/or one praseodymium-based compound. An anticorrosive paint incorporating the pigment is also provided.

19 Claims, No Drawings

ANTI-CORROSION PIGMENTS MADE OF ALUMINIUM POLYPHOSPHATE AND RARE EARTH

CROSS-REFERENCE TO RELATED APPLICATIONS

This application is a National Stage of International patent application PCT/EP2016/057583, filed on Apr. 7, 2016, which claims priority to foreign French patent application No. FR 1553006, filed on Apr. 8, 2015, the disclosures of which are incorporated by reference in their entirety.

FIELD OF THE INVENTION

The field of the invention is that of anticorrosive pigments intended to be incorporated in compositions for the preparation of a coating on a metal surface which is capable of ensuring in particular good protection of the metal surface.

BACKGROUND

Advantageously, the composition can be used as paint primer, finding highly diverse applications for which the drive is to provide coatings ensuring good protection against corrosion phenomena.

In this field, anticorrosive pigments, such as chromates, are currently used due to their effectiveness in protecting metal surfaces in the presence of water, of oxygen or of any other component liable to detrimentally affect metal surfaces, in organic formulations (paints).

The surfaces of interest are generally metal surfaces which it is desired to protect, in different types of industry, and can be of iron or of steel (coated or not coated with zinc or alloy based on zinc, aluminum, silicon, magnesium, and the like).

Nevertheless, chromates are harmful due to their high oxidizing power and must be replaced by other substances which are as effective but which are devoid of toxicity.

For substrates made of galvanized steel, alternative solutions to chromates have already been provided, such as, for example: calcium-exchanged silica pigments, pigments comprising zinc aluminum polyphosphates and/or magnesium aluminum polyphosphates and/or calcium aluminum polyphosphates and/or strontium aluminum polyphosphates, and the like.

In parallel with steels covered with zinc, there exist on the world market other types of steel coating based on zinc and on other elements, such as aluminum, silicon or magnesium, such as, for example, Galvalume® (Al: 55%, Zn: 43.5%, Si: 1.5%) or Galfan (Zn: 95%, Al: 5%).

Nevertheless, to address steels covered with Galvalume®, few specific solutions are currently provided for ensuring the replacement of chromates as anticorrosive pigments. Nevertheless, mention may be made of anticorrosive pigments which are devoid of toxicity, such as Novinox XCA02 (calcium-exchanged silica) or Novinox PAM (pigment comprising magnesium aluminum tripolyphosphate) of the Applicant, but which, in terms of anticorrosive performances, do not equal those of chromates.

This is why, in this context, the Applicant is providing a novel family of anticorrosive pigments which are particularly well-suited to the anticorrosive protection of steels covered with Galvalume® and which are also suitable for steels covered with zinc (galvanized steel, also known as HDG (hot dipped galvanized)).

SUMMARY OF THE INVENTION

More specifically, a subject matter of the present invention is an anticorrosive pigment comprising an aluminum polyphosphate, characterized in that it additionally comprises at least one cerium-based compound and/or one lanthanum-based compound and/or one praseodymium-based compound.

The anticorrosive pigment of the present invention is an anticorrosive pigment particularly suited to iron or steel substrates coated or not coated with another metal.

According to an alternative form of the invention, the aluminum polyphosphate is an aluminum tripolyphosphate.

According to an alternative form of the invention, the compound is an oxide.

According to an alternative form of the invention, the compound is a carbonate.

According to an alternative form of the invention, the compound is a cerium oxide.

According to an alternative form of the invention, the compound is cerium oxide $CeO_2$.

According to an alternative form of the invention, the compound is a lanthanum oxide.

According to an alternative form of the invention, the compound is lanthanum oxide $La_2O_3$.

According to an alternative form of the invention, the compound is a praseodymium oxide.

According to an alternative form of the invention, the compound is praseodymium oxide $Pr_6O_{11}$.

According to an alternative form of the invention, the pigment comprises:

a mixture of cerium-based compound and of lanthanum-based compound; or a mixture of cerium-based compound and of praseodymium-based compound; or a mixture of lanthanum-based compound and of praseodymium-based compound.

According to an alternative form of the invention, the pigment comprises a mixture of cerium-based compound and of lanthanum-based compound and of praseodymium-based compound.

According to an alternative form of the invention, said pigment comprises a percentage by weight of rare earth metal compound(s) of between 1% and 30%.

Another subject matter of the invention is an anticorrosive paint intended to cover a metal surface, comprising an anticorrosive pigment according to the invention.

According to an alternative form of the invention, said paint is based on polyester-melamine.

According to an alternative form of the invention, said paint is based on polyurethane.

According to an alternative form of the invention, said paint is epoxy-based.

According to an alternative form of the invention, said paint comprises a percentage by weight of anticorrosive pigment of between 1% and 15%.

A better understanding of the invention will be obtained and other advantages will become apparent on reading the description which will follow, given without limitation.

Generally, the anticorrosive pigment of the present invention comprises an aluminum polyphosphate and at least one cerium-based compound and/or one lanthanum-based compound and/or one praseodymium-based compound.

The Applicant has carried out a series of tests proving the advantage of the anticorrosive pigments of the present invention, using a steel substrate covered with Galvalume®, to which a non-chromate surface treatment according to the present invention is applied.

First Series of Comparative Tests Carried Out with a Primer Based on Polyester-Melamine (PE) Resin Incorporating an Anticorrosive Pigment of the Known Art or a Pigment According to the Invention:

The Applicant has carried out crosslinking tests in order to confirm the good stability over time of primer based on polyester-melamine (PE) resin and on the pigments provided in the present invention based on cerium or on lanthanum or on praseodymium, due to the presence of a catalyst, Nacure 2500, sensitive to alkaline entities.

In order to carry these tests through to a successful conclusion, an anticorrosive primer is prepared which incorporates pigment compounds (7% by weight) in a resin of polyester-melamine type with a thickness of 7 µm, having the following detailed composition:

| Starting Materials | % By Weight | Description | Suppliers |
|---|---|---|---|
| Cymel 303 | 5.4 | HMMM | Allnex |
| Desmophen 1665 | 47.6 | Polyester Resin | Bayer |
| Solvesso 150 | 10.7 | Aromatic Solvent | Exxon Chemical |
| Dowanol PMA | 15.4 | Glycol Ester Solvent | Dow |
| Mixing is carried out until a homogeneous preparation is obtained | | | |
| | 7.0 | Anticorrosive pigment | |
| $TiO_2$ RTC90 | 6.5 | Filler | Huntsman |
| Talc HAR T84 | 6.5 | Filler | Imerys |
| Aerosil R972 | 0.4 | Silica | Evonik |
| Bead grinding | | | |
| Nacure 2500 | 0.5 | Catalyst | King Industries |
| Total Weight | 100 | | |

Properties of the Primer Obtained:

The primer exhibits:

a pigment volume concentration (PVC) of 19.70%;

a Pigment/Binder ratio (by volume) of 0.25;

a dry film thickness of 7 µm.

The anticorrosive primer thus obtained is applied to the treated steel covered with Galvalume® using a screw rod in order to carry out tests of stability over time.

Crosslinking Tests:

The Applicant has carried out comparative tests on the crosslinking and on the stability of the primer over time according to the MEK crosslinking test, the result of the test of which is a number of to-and-fro movements at the end of which the application of a cloth impregnated with MEK (methyl ethyl ketone) destroys the primer, the test being repeated over time, the results being provided at the end of D days in the table given below.

The pigments of the known art:

L203E (strontium chromate), Novinox PAM, Novinox XCA02 (calcium-exchanged silica), Novinox ACE110 (silica-based) and Novinox PAZ (pigment comprising zinc aluminum polyphosphate);

are thus compared with pigments of the present invention: ATP 94%/$CeO_2$ 6%, ATP 94%/$Ce(CO_3)_2$ 6%, ATP 94%/$La_2O_3$ 6% and ATP 94%/$Pr_6O_{11}$ 6%.

| T and F MEK | D = 0 | D = 45 |
|---|---|---|
| L203E | 52 | 50 |
| Novinox PAM | 2 | 1 |
| Novinox XCA02 | >100 | >100 |
| Novinox ACE110 | >100 | >100 |
| Novinox PAZ | >100 | >100 |
| ATP 94%/$CeO_2$ 6% | >100 | 90 |
| ATP 94%/$Ce(CO_3)_2$ 6% | >100 | >100 |
| ATP 94%/$La_2O_3$ 6% | 94 | 93 |
| ATP 94%/$Pr_6O_{11}$ 6% | >100 | >100 |

The results of these tests show a good performance obtained and a good stability over time obtained with the pigments provided in the present invention based on cerium or on lanthanum or on praseodymium.

This is because the anticorrosive compounds of the present invention: ATP 94%/$CeO_2$ 6%, ATP 94%/$Ce(CO_3)_2$ 6%, ATP 94%/$La_2O_3$ 6% and ATP 94%/$Pr_6O_{11}$ 6% show much more satisfactory performances than with the pigment Novinox PAM in a "PE/melamine" primer and similar performances to those obtained with silica-based chromate-free pigments, such as Novinox XCA02 and Novinox ACE110, or with pigments based on aluminum polyphosphate, such as Novinox PAZ.

Anticorrosive Tests:

In order to carry out anticorrosive tests, the primers are covered with a layer of paint based on polyester-melamine with a thickness of 20 µm, also commonly known as finishing layer.

Two scratches are made in the surface:

right-hand scratch of Clemens type, with an exerted pressure of 27 psi (pounds per square inch);

left-hand scratch of Knife type, with an exerted pressure of 5 psi (pounds per square inch).

The combination is subjected to exposure to a salt spray (ASTM B117 standard) for 500 hours.

Grading of the Scratches and Edge Faces:

The Leica EZ4HD stereomicroscope and the associated image analysis software are used.

The two scratches and the two edge faces are photographed in low-angled light using the stereomicroscope.

There exists a very marked contrast between the paint surface and the degraded surface. This difference in contrast is located by the software. By virtue of a function of the software, it is possible to characterize the degraded zone. The surface area of this degraded zone is subsequently calculated using a function of the software. It is expressed in $mm^2$ of degradation.

Grading of the Full Plate:

The degraded surface area is estimated by calculating the surface area of each blister formed on the plate. As the blisters are not very numerous and relatively small in size, it takes very little time to add up all the blisters in $mm^2$.

General Grading:

In order to obtain the total degraded surface area in $mm^2$, the different degraded surface areas: clemens scratch+knife scratch+left-hand edge face+right-hand edge face+full plate, are subsequently added up.

The total surface area of each plate is subsequently measured.

The nondegraded surface area in $mm^2$ is obtained by subtraction: total surface area−degraded surface area.

The anticorrosive performance as percentage is determined by the following formula: (nondegraded surface area/total surface area)*100.

The lengths of scratches and edge faces are the same from one plate to another. It is thus possible to compare the anticorrosive performance between each plate.

| | Left-hand scratch mm$^2$ | Right-hand scratch mm$^2$ | Left-hand edge face mm$^2$ | Right-hand edge face mm$^2$ | Full plate mm$^2$ | Total degradation mm$^2$ | Anticorrosive performance % |
|---|---|---|---|---|---|---|---|
| ATP 100% | 294 | 193 | 1061 | 1145 | 20 | 2713 | 72.6 |
| ATP 97%/CeO$_2$ 3% | 91 | 113 | 803 | 706 | 0 | 1713 | 82.7 |
| ATP 94%/CeO$_2$ 6% | 97 | 77 | 785 | 739 | 0 | 1698 | 82.8 |
| ATP 75%/CeO$_2$ 25% | 83 | 128 | 776 | 725 | 0 | 1712 | 82.7 |
| ATP 50%/CeO$_2$ 50% | 90 | 77 | 845 | 1343 | 40 | 2395 | 75.8 |
| ATP 25%/CeO$_2$ 75% | 263 | 236 | 917 | 1304 | 0 | 2720 | 72.5 |
| CeO$_2$ 100% | 452 | 389 | 1865 | 1436 | 0 | 4142 | 58.2 |
| ATP 94%/La$_2$O$_3$ 6% | 116 | 111 | 862 | 646 | 0 | 1735 | 81.6 |
| ATP 75%/La$_2$O$_3$ 25% | 123 | 104 | 851 | 854 | 0 | 1932 | 80.5 |
| ATP 50%/La$_2$O$_3$ 50% | 127 | 96 | 846 | 841 | 20 | 1930 | 80.5 |
| ATP 25%/La$_2$O$_3$ 75% | 124 | 118 | 850 | 836 | 20 | 1948 | 80.3 |
| La$_2$O$_3$ 100% | 133 | 129 | 821 | 829 | 40 | 1952 | 80.3 |
| ATP 94%/Pr$_6$O$_{11}$ 6% | 109 | 91 | 879 | 636 | 0 | 1715 | 82.6 |
| ATP 75%/Pr$_6$O$_{11}$ 25% | 95 | 91 | 864 | 670 | 20 | 1740 | 82.4 |
| ATP 50%/Pr$_6$O$_{11}$ 50% | 88 | 86 | 792 | 756 | 20 | 1742 | 82.4 |
| ATP 25%/Pr$_6$O$_{11}$ 75% | 86 | 97 | 812 | 763 | 0 | 1758 | 82.2 |
| Pr$_6$O$_{11}$ 100% | 98 | 92 | 823 | 722 | 40 | 1775 | 82.1 |
| ATP 94%/Ce(CO$_3$)$_2$ 6% | 268 | 283 | 820 | 1231 | 60 | 2662 | 73.0 |
| L203E | 171 | 123 | 870 | 777 | 0 | 1941 | 80.3 |
| Novinox PAM | 196 | 108 | 815 | 759 | 0 | 1878 | 80.9 |
| Novinox XCA02 | 185 | 118 | 955 | 1246 | 20 | 2524 | 74.4 |
| Novinox ACE110 | 235 | 97 | 837 | 1123 | 15 | 2307 | 76.6 |
| Novinox PAZ | 182 | 112 | 1358 | 837 | 15 | 2504 | 74.6 |

It emerges from these combined tests that:

the mixtures of ATP and of cerium-based or lanthanum-based or praseodymium-based compounds provide better results in terms of anticorrosive performances on Galvalume® than those obtained with ATP alone or with a cerium-based or lanthanum-based or praseodymium-based compound alone;

the compositions comprising 94% of ATP and 6% of cerium or lanthanum or praseodymium oxide lead to very good results, which may even be better than those obtained with strontium chromate.

It is possible that the cerium or the lanthanum or the praseodymium can block the cathode sites by forming insoluble hydroxides and oxides at the surface of the zinc, resulting in a decrease in the current density and thus in a reduction in the corrosion process.

In conclusion, very good combined performances in terms of tests of crosslinking and of anticorrosive performance validate the advantage of the pigments of the present invention in the context of primer based on polyester-melamine.

Second Series of Comparative Tests Carried Out with a Primer Based on Polyurethane (PU) Resin Incorporating an Anticorrosive Pigment of the Known Art or a Pigment According to the Invention:

It should be noted that the Applicant has not had to carry out tests of crosslinking and of control of stability over time, due to the neutrality with regard to the pH of the catalyst employed: DBTL.

In order to carry these tests through to a successful conclusion, an anticorrosive primer is prepared which incorporates pigment compounds (7% by weight) in a resin of polyurethane type with a thickness of 7 μm, having the following detailed composition:

| Starting Materials | % by Weight | Description | Suppliers |
|---|---|---|---|
| Mixing is carried out in the following order: | | | |
| Desmophen 1665 | 38.70 | Polyester Resin | Bayer |
| Solvesso 150 | 11.8 | Aromatic hydrocarbon, solvent | Exxon Chemical |
| Dowanol PMA | 11.8 | Glycol ester, solvent | Dow |
| Mixing is carried out until a homogeneous composition is obtained | | | |
| Anticorrosive pigment | 7.0 | Corrosion inhibitor | |
| TiO$_2$ RTC90 | 7.4 | Titanium oxide, rutile | Huntsman |
| Talc HAR T84 | 7.4 | Talc, inorganic filler | Imerys Talc |
| Aerosil R972 | 1.0 | Fumed silica | Degussa |
| Grinding is carried out until a Hegman fineness of 8 is obtained | | | |

| Starting Materials | % by Weight | Description | Suppliers |
|---|---|---|---|
| Desmodur BL 3175 | 14.30 | Blocked polyisocyanate | Bayer |
| DBTL | 0.5 | Catalyst | |
| Total weight | 100.0 | | |

Properties of the Primer Obtained:
  The primer exhibits:
  a pigment volume concentration (PVC) of 22.11%;
  a Pigment/Binder ratio (by volume) of 0.28;
  a dry film thickness of 7 μm.

The anticorrosive primer thus obtained is applied to the treated steel covered with Galvalume® using a screw rod.

In order to carry out anticorrosive tests, the primers are covered with a layer of paint based on polyester-melamine with a thickness of 20 μm, also commonly known as finishing layer.

Two scratches are made in the surface:
  right-hand scratch of Clemens type, with an exerted pressure of 27 psi (pounds per square inch);
  left-hand scratch of Knife type, with an exerted pressure of 5 psi (pounds per square inch).

The combination is subjected to exposure to a salt spray (ASTM B117 standard) for 500 hours.

The grading process is identical to that deployed in the preceding case of PE-melamine resin.

The comparative tests were carried out on pigments of the known art:
  L203E (strontium chromate), Novinox PAM and Novinox PAT 15 (magnesium phosphate);
  and are thus compared with pigments of the present invention:
  ATP 94%/$CeO_2$ 6%, ATP 94%/$La_2O_3$ 6% and ATP 89.3%/$CeO_2$ 5.7%/$La_2O_3$ 5%.

| | Left-hand scratch $mm^2$ | Right-hand scratch $mm^2$ | Left-hand edge face $mm^2$ | Right-hand edge face $mm^2$ | Full plate $mm^2$ | Total degradation $mm^2$ | Anticorrosive performance % |
|---|---|---|---|---|---|---|---|
| L203E | 82 | 46 | 633 | 226 | 4 | 992 | 89.9 |
| Novinox PAM | 176 | 245 | 856 | 774 | 36 | 2087 | 78.8 |
| Novinox PAT 15 | 167 | 160 | 795 | 797 | 100 | 2020 | 79.5 |
| ATP 94%/$CeO_2$ 6% | 172 | 133 | 809 | 911 | 54 | 2080 | 78.9 |
| ATP 94%/$La_2O_3$ 6% | 438 | 113 | 693 | 810 | 49 | 2103 | 78.7 |
| ATP 89.3%/$CeO_2$ 5.7%/$La_2O_3$ 5% | 191 | 149 | 739 | 731 | 9 | 1819 | 81.6 |

These test results also show performances which are entirely satisfactory and at a level comparable to those obtained with L203E (toxic strontium chromate) during anticorrosive tests for anticorrosive pigments of the invention which are devoid of toxicity in the context of polyurethane primer, this being the case particularly with the use of compositions including different rare earth metal entities.

Third Series of Comparative Tests Carried Out with a Primer Based on Epoxy Resin Incorporating an Anticorrosive Pigment of the Known Art or a Pigment According to the Invention:

In order to carry these tests through to a successful conclusion, an anticorrosive primer is prepared which incorporates pigment compounds (7% by weight) in a resin of epoxy type with a thickness of 7 μm, having the following detailed composition:

| Starting Materials | % by Weight | Description | Suppliers |
|---|---|---|---|
| Epikote 1007 | 25.1 | Epoxy resin | Hexion |
| Dowanol PMA | 19.1 | Glycol ester, solvent | Dow |
| Solvesso 150 | 14.4 | Aromatic hydrocarbon, solvent | Exxon Chemical |
| DIAL | 1.8 | Diacetone alcohol | |
| IBA | 5.4 | Isobutyl alcohol | |
| Mixing is carried out until a homogeneous composition is obtained | | | |

| Starting Materials | % by Weight | Description | Suppliers |
|---|---|---|---|
| Cymel 1123 | 10.75 | Modified benzoguanamine resin | Allnex |
| Coatosil MP200 | 1 | Silane additive | Momentive |
| Mixing is carried out for 30 minutes until a homogeneous preparation is obtained | | | |
| Anticorrosive pigment | 7 | Anticorrosive pigment | SNCZ |
| $TiO_2$ RTC90 | 7 | Titanium oxide, rutile | Huntsman |
| Talc HAR T84 | 8 | Talc, inorganic filler | Rio Tinto Minerals |
| Grinding is carried out until a Hegman fineness of 7.5 is obtained | | | |
| Nacure 2500 | 0.5 | Catalyst | King Industries |
| TOTAL WEIGHT | 100.0 | PVC: 17.74 "Volumic solids": 46.14 P/B vol: 0.22 | |

Properties of the Primer Obtained:
The primer exhibits:
a pigment volume concentration (PVC) of 17.74%;
a Pigment/Binder ratio (by volume) of 0.22;
a dry film thickness of 7 μm.
The anticorrosive primer thus obtained is applied to the treated steel covered with Galvalume® using a screw rod.

In order to carry out anticorrosive tests, the primers are covered with a layer of paint based on polyester-melamine with a thickness of 20 μm, also commonly known as finishing layer.

Two scratches are made in the surface:
right-hand scratch of Clemens type, with an exerted pressure of 27 psi (pounds per square inch);
left-hand scratch of Knife type, with an exerted pressure of 5 psi (pounds per square inch).

The combination is subjected to exposure to a salt spray (ASTM B117 standard) for 500 hours.

The grading process is identical to that deployed in the preceding case of PE-melamine resin.

The comparative tests were carried out on pigments of the known art:
L203E (strontium chromate), Novinox XCA02, Novinox PAM and Novinox PAT 15 (magnesium phosphate);
and are thus compared with a pigment of the present invention:
ATP 94%/$CeO_2$ 6%.

| | Left-hand scratch $mm^2$ | Right-hand scratch $mm^2$ | Left-hand edge face $mm^2$ | Right-hand edge face $mm^2$ | Full plate $mm^2$ | Total degradation $mm^2$ | Anticorrosive performance % |
|---|---|---|---|---|---|---|---|
| ATP 94%/$CeO_2$ 6% | 88 | 81 | 297 | 339 | 8 | 814 | 90.4 |
| Novinox XCA02 | 93 | 112 | 263 | 345 | 0 | 814 | 90.4 |
| Novinox PAT 15 | 121 | 136 | 281 | 345 | 0 | 884 | 89.6 |
| L203E | 95 | 136 | 422 | 245 | 0 | 899 | 89.4 |
| Novinox PAM | 128 | 121 | 305 | 345 | 0 | 899 | 89.4 |

These test results also show performances which are entirely satisfactory and at a level comparable to those obtained with L203E (toxic strontium chromate) during anticorrosive tests for anticorrosive pigments of the invention which are devoid of toxicity in the context of epoxy primer applied to Galvalume®, this being the case particularly with the use of compositions including different rare earth metal entities.

Fourth Series of Comparative Tests Carried Out with a Primer Based on Epoxy Resin Incorporating an Anticorrosive Pigment of the Known Art or a Pigment According to the Invention:

In order to carry these tests through to a successful conclusion, an anticorrosive primer is prepared which incorporates pigment compounds (7% by weight) in a resin of epoxy type with a thickness of 7 μm, having a composition identical to that of the third series of tests.

Properties of the Primer Obtained:
The primer exhibits:
a pigment volume concentration (PVC) of 17.74%;
a Pigment/Binder ratio (by volume) of 0.22;
a dry film thickness of 7 μm.
The anticorrosive primer thus obtained is applied to the treated galvanized (HDG) steel using a screw rod.

In order to carry out anticorrosive tests, the primers are covered with a layer of paint based on polyester-melamine with a thickness of 20 μm, also commonly known as finishing layer.

Two scratches are made in the surface:
right-hand scratch of Clemens type, with an exerted pressure of 25 psi (pounds per square inch);
left-hand scratch of Knife type, with an exerted pressure of 5 psi (pounds per square inch).

The combination is subjected to exposure to a salt spray (ASTM B117 standard) for 500 hours.

The grading process is identical to that deployed in the preceding case of PE-melamine resin.

The comparative tests were carried out on pigments of the known art:
L203E (strontium chromate), Novinox XCA02 and Novinox ACE110;
and are thus compared with a pigment of the present invention: ATP 94%/CeO$_2$ 6%.

| | Left-hand scratch mm$^2$ | Right-hand scratch mm$^2$ | Left-hand edge face mm$^2$ | Right-hand edge face mm$^2$ | Full plate mm$^2$ | Total degradation mm$^2$ | Anticorrosive performance % |
|---|---|---|---|---|---|---|---|
| L203E | 69 | 68 | 165 | 255 | 0 | 557 | 94.3 |
| ATP 94%/CeO$_2$ 6% | 202 | 455 | 228 | 211 | 0 | 1096 | 89.4 |
| Novinox ACE110 | 236 | 375 | 242 | 218 | 0 | 1071 | 89.0 |
| Novinox XCA02 | 500 | 447 | 250 | 218 | 0 | 1417 | 85.5 |

These test results also show performances which are entirely satisfactory and at a level comparable to those obtained with L203E (toxic strontium chromate) during anticorrosive tests for anticorrosive pigments of the invention which are devoid of toxicity in the context of epoxy primer applied to galvanized (HDG) steel, this being the case particularly with the use of compositions including different rare earth metal entities.

The invention claimed is:

1. An anticorrosive pigment consisting of an aluminum tripolyphosphate, and at least one cerium-based compound and/or one lanthanum-based compound and/or one praseodymium-based compound.

2. The anticorrosive pigment as claimed in claim 1, wherein the compound is an oxide.

3. The anticorrosive pigment as claimed in claim 1, wherein the compound is a carbonate.

4. The anticorrosive pigment as claimed in claim 2, comprising a cerium oxide.

5. The anticorrosive pigment as claimed in claim 4, comprising cerium oxide or CeO$_2$.

6. The anticorrosive pigment as claimed in claim 2, comprising a lanthanum oxide.

7. The anticorrosive pigment as claimed in claim 6, comprising lanthanum oxide or La$_2$O$_3$.

8. The anticorrosive pigment as claimed in claim 2, comprising a praseodymium oxide.

9. The anticorrosive pigment as claimed in claim 8, comprising praseodymium oxide or Pr$_6$O$_{11}$.

10. The anticorrosive pigment as claimed in claim 1, comprising a mixture of cerium-based compound and of lanthanum-based compound.

11. The anticorrosive pigment as claimed in claim 1, comprising a mixture of cerium-based compound and of praseodymium-based compound.

12. The anticorrosive pigment as claimed in claim 1, comprising a mixture of lanthanum-based compound and of praseodymium-based compound.

13. The anticorrosive pigment as claimed in claim 1, comprising a mixture of cerium-based compound and of lanthanum-based compound and of praseodymium-based compound.

14. The anticorrosive pigment as claimed in claim 1, comprising a percentage by weight of the at least one cerium-based compound and/or the lanthanum-based compound and/or the praseodymium-based compound is between 1% and 30%.

15. An anticorrosive paint intended to cover a metal surface, comprising an anticorrosive pigment as claimed in claim 1.

16. The anticorrosive paint as claimed in claim 15, wherein it is based on polyester-melamine.

17. The anticorrosive paint as claimed in claim 15, wherein it is based on polyurethane.

18. The anticorrosive paint as claimed in claim 15, wherein it is epoxy-based.

19. The anticorrosive paint as claimed in claim 15, comprising a percentage by weight of anticorrosive pigment of between 1% and 15%.

* * * * *